United States Patent
Andriyanov et al.

(10) Patent No.: US 11,252,094 B1
(45) Date of Patent: Feb. 15, 2022

(54) APPARATUS AND METHOD FOR APPLICATION-AWARE NETWORK TRAFFIC MANAGEMENT

(71) Applicant: Aquantia Corporation, San Jose, CA (US)

(72) Inventors: Alexey Andriyanov, Novgorod (RU); Simon Edelhaus, San Ramon, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/514,844

(22) Filed: Jul. 17, 2019

Related U.S. Application Data

(60) Provisional application No. 62/699,608, filed on Jul. 17, 2018.

(51) Int. Cl.
*H04L 12/859* (2013.01)

(52) U.S. Cl.
CPC ................ *H04L 47/2475* (2013.01)

(58) Field of Classification Search
CPC ............. H04L 47/2433; H04L 47/2475; H04L 47/2483
See application file for complete search history.

(56) References Cited

U.S. PATENT DOCUMENTS

| | | | | |
|---|---|---|---|---|
| 6,141,686 A | * | 10/2000 | Jackowski | ............ H04L 41/065 709/206 |
| 2005/0169173 A1 | * | 8/2005 | Mahdavi | ............. H04L 47/2475 370/230 |
| 2014/0334392 A1 | * | 11/2014 | Gage | ..................... H04L 5/0092 370/329 |

FOREIGN PATENT DOCUMENTS

EP    3331270 A1 *  6/2018  ............. H04L 47/24

* cited by examiner

*Primary Examiner* — Khoa Huynh

(57) ABSTRACT

A computer-implemented method for controlling data traffic in a network system is disclosed. The method includes establishing a list of prioritized applications on a user device. The applications are monitored for network activity. One or more management packets are assembled in response to detecting network activity corresponding to one of the prioritized applications. The one or more management packets include network attribute information. The management packet is then transferred to a network switch for use in configuring the prioritization of data traffic on the network system.

20 Claims, 2 Drawing Sheets

APPARATUS AND METHOD FOR APPLICATION-AWARE NETWORK TRAFFIC MANAGEMENT

RELATED APPLICATION(S)

This application claims benefit of priority to Provisional U.S. Patent Application No. 62/699,608, titled "APPARATUS AND METHOD FOR APPLICATION-AWARE NETWORK TRAFFIC MANAGEMENT", filed Jul. 17, 2018, the aforementioned priority application being hereby incorporated by reference in its entirety.

TECHNICAL FIELD

The disclosure herein relates to communications systems, and more specifically to high-speed networking systems and methods.

BACKGROUND

Networking systems such as wide area networks (WAN) and local area networks (LAN) often involve data transfers having different data attributes. The attributes are generally application-specific, and may involve latency and/or bandwidth requirements in order to satisfy a certain level of user-satisfaction, or Quality of Service (QoS). Various ways of addressing QoS variability in a networking system have been proposed.

For networks that utilize a network switch, or router, some proposals tag all data packets sent to the router from a user device, alerting the router to prioritize the tagged data packets in accordance with a prioritization scheme. Unfortunately, ingress data from Internet Service Providers (ISP) usually don't provide such tags, such that ingress data is non-prioritized. Other proposals provide for a database stored on the router, and managed centrally via router firmware to identify prioritized data traffic. It would be desirable to manage network traffic from one or more user devices, with minimal changes to the network router.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Methods and apparatus for networking systems and devices are disclosed. In one embodiment, a computer-implemented method for controlling data traffic in a network system is disclosed. The method includes establishing a list of prioritized applications on a user device. The applications are monitored for network activity. One or more management packets are assembled in response to detecting network activity corresponding to one of the prioritized applications. The one or more management packets include network data traffic attribute information. The one or more management packets are then transferred to a network switch for use in configuring the prioritization of data traffic on the network system.

Figure 1:
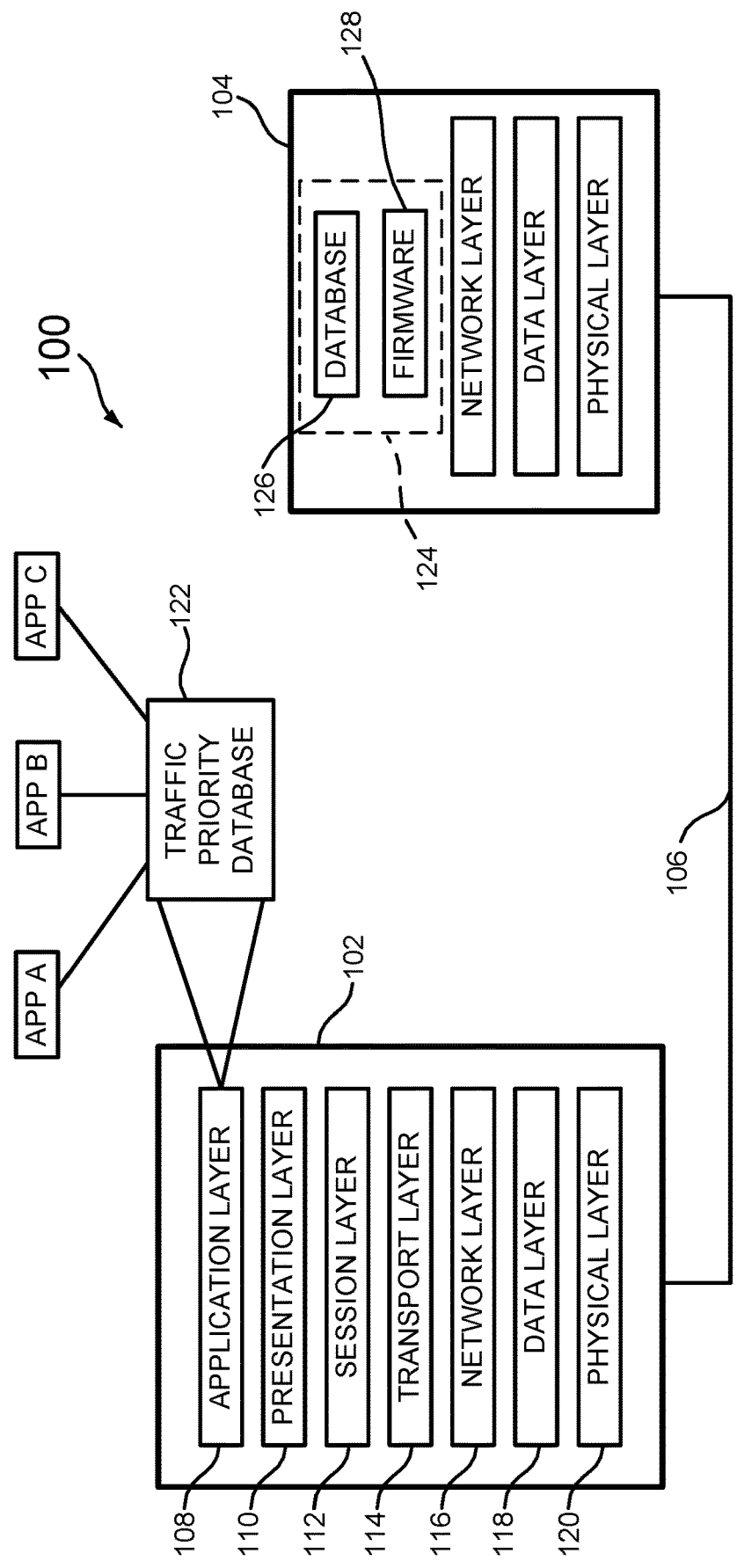
FIG. 1 illustrates one embodiment of a user device interfaced with a network switch.

Referring now to FIG. 1, one embodiment for a networking system, generally designated 100, includes a user device 102 that interfaces with a network switch or router 104, via a wired or wireless signaling medium 106. The user device may include any computing device such as a personal computer, mobile computing device, laptop, smartphone, tablet, and so forth. The network switch or router generally provides network access for the user device to communicate with other user devices, inside and outside the network.

Further referring to FIG. 1, for one embodiment, the user device 102 employs a networking architecture consistent with the Open Systems Interconnection (OSI) 7-layer model, with a top-level Application Layer 108 that lays atop respective Presentation, Session, and Transport Layers 110, 112, and 114. A Network Layer 116 assembles data and management IP packets, as described more fully below, while respective Data and Physical Layers 118 and 120 provide for network connectivity.

Further referring to FIG. 1, the Application Layer 108 may include a variety of different applications available for use by the user device 102, including those involving video streaming, audio, gaming and so forth. Agent software is also provided to manage data traffic associated with the applications. The agent software collects information regarding each application, such as the application name, and network flow attributes. Specific attributes may include packet destination IP addresses and ports, among others. The agent software utilizes the collected information to assemble an updateable database or look-up table 122 of the applications, prioritized based on the network flow attributes.

For one embodiment, the information included in the application data base is sent via the OSI stack to the Network Layer 116, where a management packet may be assembled for transmission to the network switch 104. The Network Layer also assembles standard data packets that may be transferred to the switch. For some embodiments, the dispatch or transmission of application data packets is carried out via a "primary" channel, while intermittent transmission of management packets form a virtual "side-band" channel. The management packets, in one embodiment, may be sent intermittently, to inform the network switch of applications whose data packets should be prioritized. In this manner, the priority information is thus not included within each application data packet (the primary channel), but rather within one or more intermittent management packets (the side-band channel).

With continued reference to FIG. 1, the router 104 may also be configured consistent with the OSI framework, with various Layers including one or more software services in an Application Layer 124 to monitor receipt of management packets from the user device. In response to receiving application information in a given management packet, a priority database 126 stored on the router may be generated by firmware 128 and/or updated to reflect traffic prioritization, or QoS, or other network policy for handling data transfers associated with the various applications.

Figure 2:
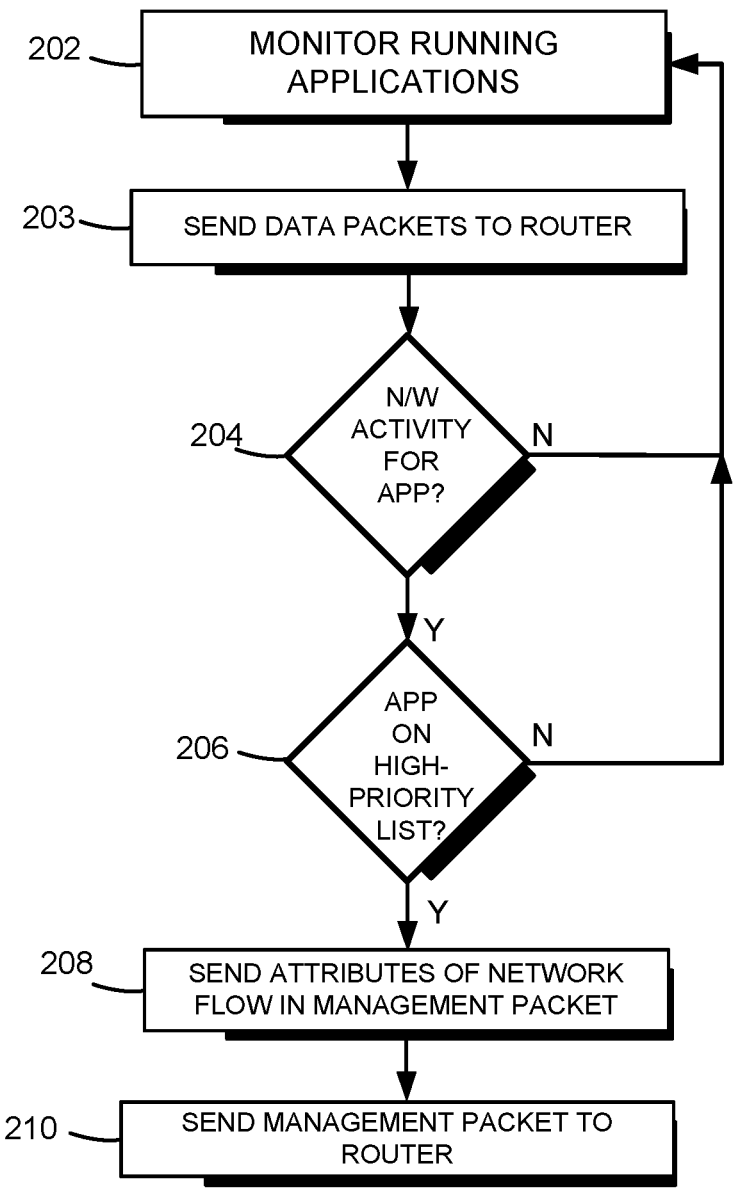
FIG. 2 illustrates a flowchart of steps setting forth one embodiment of a method of operation of a user device for managing network traffic.

In operation, a user device may generally function according to steps set out in FIG. 2. At 202, the software agent running on the user device monitors applications that are available, running and/or terminating. While this is happening, data packets are sent to the router without modification, at 203. When the monitoring detects network activity associated with a given application, at 204, then a further determination is carried out, at 206, to see whether the application is identified as a high-priority in the application database. If the application is identified in the priority database, then one or more management packets are generated, at 208, embedded with attribute information, and sent to the router, at 210.

Figure 3:
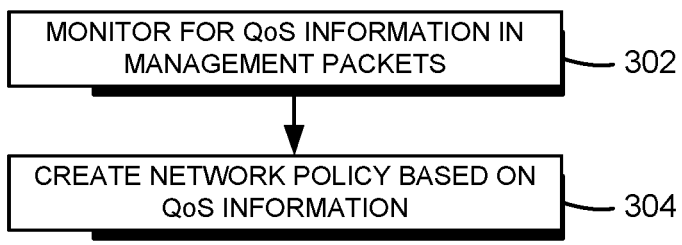
FIG. 3 illustrates a flowchart of steps setting forth one embodiment of a method of operation of a network switch for managing network traffic.

Referring now to FIG. 3, the router also monitors for the QoS information in management packets, at 302, and in response to receiving a management packet, creates and/or modifies its network policy based on the network attribute information extracted from the management packet, at 304. This may be accomplished through a service running on the router that converts the QoS information to traffic policy commands, such as Linux traffic control or an API provided by a hardware vendor. Thus, in this manner, the router may be apprised of where ingress data should be prioritized, based on applications running on user devices.

For some embodiments, various additional features may be employed to more fully optimize the application-based prioritization method described above. For example, updating network policy information may be carried out in response to pre-defined network events, such as one or more applications initializing or terminating, or where multiple applications are running simultaneously on the same or different user devices.

Those skilled in the art will appreciate that the embodiments described above enhance a user device's network bandwidth for applications that require time-sensitive data transfers, such as gaming or video streaming. By providing a distributed application-aware traffic management prioritization scheme initiated by user devices, ingress data to the router, such as from an ISP, may be correctly prioritized to optimize a user's experience. This allows for dynamic creation of priority rules from information unavailable on the router.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '$\overline{<\text{signal name}>}$') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A method of operation for a user device, comprising:
accessing a local area network managed by a network switch;
establishing a list of prioritized applications stored on the user device;
monitoring network activity associated with the prioritized applications, the monitoring performed by the user device;
assembling one or more management packets with the user device in response to detecting network activity corresponding to one of the prioritized applications, the one or more management packets including a name of at least one of the prioritized applications running on the user device and network attribute information, the network attribute information specifying at least a destination IP address; and transferring the one or more management packets to the network switch to instruct the network switch to grant priority to data packets of the prioritized applications on the local area network.

2. The method of claim 1, wherein establishing the list of prioritized applications includes:
   collecting network flow attributes for each of multiple applications to run on the user device; and
   prioritizing the multiple applications to generate the list of prioritized applications based on the network flow attributes.

3. The method of claim 2, wherein the collecting network flow attributes for each of multiple applications includes:
   collecting a packet destination port identifier for each of the multiple applications.

4. The method of claim 1, wherein the establishing a list of prioritized applications includes establishing a list of prioritized applications in the form of an updateable database stored in the user device.

5. The method of claim 1, wherein the establishing a list of prioritized applications includes establishing a list of prioritized applications in the form of a look-up table stored in the user device.

6. The method of claim 1, further comprising:
   transmitting application data packets to the network switch via a primary channel; and
   transmitting the management packets to the network switch via a virtual side-band channel that is outside of the primary channel.

7. The method of claim 6, wherein the management packets are transmitted intermittently.

8. A non-transitory computer-readable storage medium, the medium storing instructions that, when executed by a user computer device will cause the user computer device to:
   access a local area network managed by a network switch;
   establish a list of prioritized applications stored on the user computer device;
   monitor network activity associated with the prioritized applications, the monitoring performed by the user computer device;
   assemble one or more management packets with the user computer device in response to detecting network activity corresponding to one of the prioritized applications, the one or more management packets including a name of at least one of the prioritized applications running on the user computer device and network attribute information, the network attribute information specifying a destination address; and
   transfer the one or more management packets to the network switch to instruct the network switch to grant priority to data packets of the prioritized applications on the local area network.

9. The non-transitory computer-readable storage medium of claim 8, wherein the instructions that, when executed by the user computer device will cause the user computer device to establish the list of prioritized applications includes instructions that, when executed by the user computer device will cause the user computer device to:
   collect network flow attributes for each of multiple applications to run on the user computer device; and
   prioritize the applications based on the network flow attributes.

10. The non-transitory computer-readable storage medium of claim 9, wherein:
   the instructions that, when executed by the user computer device will cause the user computer device to establish the list of prioritized applications includes instructions that, when executed by the user computer device will cause the user computer device to collect network flow attributes that include:
   a packet destination port identifier.

11. The non-transitory computer-readable storage medium of claim 8, wherein the instructions that, when executed by the user computer device will cause the user computer device to establish the list of prioritized applications in the form of an updateable database stored in the user computer device.

12. The non-transitory computer-readable storage medium of claim 8, wherein the instructions that, when executed by the user computer device will cause the user computer device to establish the list of prioritized applications in the form of a look-up table stored in the user computer device.

13. The non-transitory computer-readable storage medium of claim 8, further comprising instructions that, when executed by the user computer device will cause the user computer device to:
   transmit application data packets to the network switch via a primary channel; and
   transmit the management packets to the network switch via a virtual side-band channel that is outside of the primary channel.

14. The non-transitory computer-readable storage medium of claim 13, wherein the management packets are transmitted intermittently.

15. A method of operation for a user device, comprising:
   controlling data traffic in a network system through use of a user device by
      accessing a local area network managed by a network switch;
      establishing a list of prioritized applications stored on the user device;
      monitoring network activity associated with the prioritized applications, the monitoring performed by the user device;
      assembling one or more management packets with the user device in response to detecting network activity corresponding to one of the prioritized applications, the one or more management packets including a name of at least one of the prioritized applications running on the user device and network attribute information, the network attribute information specifying a destination address; and
      transferring the one or more management packets to the network switch to instruct the network switch to grant priority to data packets of the prioritized applications on the local area network.

16. The method of claim 15, wherein establishing the list of prioritized applications includes:
   collecting network flow attributes for each of multiple applications to run on the user device; and
   prioritizing the applications based on the network flow attributes.

17. The method of claim 16, wherein the network flow attributes include:
   a packet destination port identifier.

18. The method of claim 15, wherein the list of prioritized applications is in the form of an updateable database stored in the user device.

19. The method of claim 15, wherein the list of prioritized applications is in the form of a look-up table stored in the user device.

20. The method of claim 15, further comprising:
transmitting application data packets to the network switch via a primary channel; and
intermittently transmitting the management packets to the network switch via a virtual side-band channel that is outside of the primary channel.

\* \* \* \* \*